United States Patent
Zheng et al.

(10) Patent No.: US 7,660,395 B2
(45) Date of Patent: Feb. 9, 2010

(54) COMMUNICATION CHANNEL CAPACITY ESTIMATION

(75) Inventors: Ling Zheng, Billerica, MA (US); Michael A. Lund, W. Newton, MA (US)

(73) Assignee: Aware, Inc., Bedford, MA (US)

( * ) Notice: Subject to any disclaimer, the term of this patent is extended or adjusted under 35 U.S.C. 154(b) by 0 days.

(21) Appl. No.: 10/596,889

(22) PCT Filed: Feb. 11, 2005

(86) PCT No.: PCT/US2005/004015

§ 371 (c)(1),
(2), (4) Date: Jun. 28, 2006

(87) PCT Pub. No.: WO2005/078951

PCT Pub. Date: Aug. 25, 2005

(65) Prior Publication Data

US 2007/0025548 A1    Feb. 1, 2007

Related U.S. Application Data

(60) Provisional application No. 60/543,966, filed on Feb. 11, 2004.

(51) Int. Cl.
*H04M 1/24* (2006.01)
*H04M 3/08* (2006.01)
*H04M 3/22* (2006.01)

(52) U.S. Cl. .................................................. 379/1.04
(58) Field of Classification Search ................. 379/1.04
See application file for complete search history.

(56) References Cited

U.S. PATENT DOCUMENTS

2004/0101130 A1 * 5/2004 Shi et al. ............... 379/399.01
2008/0071516 A1 * 3/2008 Cioffi et al. .................... 703/21

FOREIGN PATENT DOCUMENTS

| EP | 1 248 383 A1 | 10/2002 |
| WO | WO 01/24482 A1 | 4/2001 |
| WO | WO 02/87103 A1 | 1/2002 |

OTHER PUBLICATIONS

PCT International Search Report dated Feb. 11, 2004 (PCT/US2005/004015).

* cited by examiner

*Primary Examiner*—Alexander Jamal
(74) *Attorney, Agent, or Firm*—Jason H. Vick; Sheridan Ross, PC

(57) ABSTRACT

Prediction of a channel capacity is accomplished based on a TDR echo without explicitly estimating the topology of the line. The prediction is based on obtaining a measured TDR echo, determining a theoretical TDR echo for a plurality of loop lengths, estimating the equivalent TDR length based on an optimization, updating the equivalent TDR length and utilizing the updated TDR length to predict one or more of the upstream and downstream data rates.

16 Claims, 12 Drawing Sheets

|Error| == 0 kbps : 0.2
|Error| <= 100 kbps : 0.47
|Error| <= 200 kbps : 0.72
|Error| <= 300 kbps : 0.87
|Error| <= 400 kbps : 0.95
|Error| <= 500 kbps : 0.97

COMMUNICATION CHANNEL CAPACITY ESTIMATION

RELATED APPLICATION DATA

This application claims the benefit of and priority under 35 U.S.C. §119(e) to U.S. Provisional Application No. 60/543,966, entitled "Equivalent Estimation Method for Evaluating Subscriber Lines Based On Time Domain Reflectometry," filed Feb. 11, 2004, which is incorporated herein by reference in its entirety.

BACKGROUND

1. Field of the Invention

This invention generally relates to communication systems. In particular, an exemplary embodiment of this invention relates to estimating communication channel capacity. More particularly, an exemplary aspect of the present invention relates to estimating digital communications channel capacity.

2. Description of Related Art

Digital Subscriber Line (DSL) technology makes it possible to transport high bit rate digital information via a communications channel, such as a subscriber line. The channel capacity, which is defined as the obtainable data rate for a given line, is based on the physical structure and topology of the line, such as the length of the line, gauge, existence of bridged taps, bridged tap locations and lengths, etc. Thus, if the topology of the line is known, the data rate can be predicted prior to providing DSL service to a customer.

Time domain reflectometry (TDR) is a very useful tool for characterizing a subscriber line. TDR operates by sending an electrical pulse down the line and measuring the returned signal, referred to as a TDR echo. The measured TDR echo contains information about the physical structure and topology of the line.

The most common method for evaluating the channel capacity from a TDR echo is by explicitly estimating the physical topology of the line based on the transmission line theory, and then searching a database to find a data rate corresponding to the specific topology. One issue with this approach is the estimation complexity increases dramatically when the topology of the line is complex. For example, consider a line with N consecutive sections of different gauges but without bridged taps. Since there are two variables that need to be estimated for each section, the gauge and the length, the searching space is 2N dimensional. Thus, the computation complexity increases exponentially with the number of distinct sections.

SUMMARY

The ultimate goal of estimating the topology of a subscriber line from the TDR echo is to evaluate the channel capacity of the line. Hence, if one can estimate a line with a much simpler topology but the same channel capacity as the actual line from the TDR echo, the goal can be achieved with much less computation complexity.

An exemplary embodiment of the present invention follows this theory, and provides a method of evaluating the channel capacity from the TDR echo without explicitly estimating the topology of the line.

For simplicity, herein a subscriber line without bridged tap is referred to as a straight line. Here "straight" means no bridged tap presented. Also, a subscriber line is referred to herein as a line, a loop or a wire interchangeably.

An exemplary embodiment of the present invention is developed based on transmission line theory. A typical transmission line system can be schematically represented as illustrated in FIG. 1, where $V_S$ is the output voltage of the source, $Z_S$ is the output impedance of the source, $Z_L$ is the input impedance of the load, and L is the length of the line connecting the source and the load. $V_S$, $Z_S$ and $Z_L$ are functions of frequency. According to the transmission line theory, when the electrical wave generated by the source travels down to the line, it is attenuated by the line, and reflected whenever there is an impedance discontinuity. The wave travels forward and backward inside the line to infinity.

Assume the characteristic impedance and the propagation constant of a given line to be $Z_0$ and $\gamma$, where $Z_0$ and $\gamma$ are functions of frequency. With a straight loop with a single gauge, the only impedance changes are (1) at the connection between the source and the line, and (2) at the connection between the line and the load. Assume the reflection coefficient, which is defined as the ratio between the backward voltage wave (toward the source) and the forward voltage wave (away from the source), to be $\rho_s$ at the source output, and to be $\rho_L$ at the load, where $$\rho_s = \frac{Z_s - Z_0}{Z_s + Z_0},$$

$$\rho_L = \frac{Z_L - Z_0}{Z_L + Z_0}.$$

According to the wave propagation theory, the voltage at the output of the source, denoted as $V_0$, can be represented by a combination of an incident wave and infinite number of multi-reflections caused by impedance discontinuity:

Incident wave: $V_0^{(0)} = \frac{Z_0}{Z_0 + Z_s} V_s$ $1^{st}$ reflection:
Forward wave $V_0^{(1)+} = V_0^{(0)} \cdot e^{-2\gamma L} \cdot \rho_L \cdot \rho_s$,
Backward wave $V_0^{(1)-} = V_0^{(0)} \cdot e^{-2\gamma L} \cdot \rho_L$, $2^{nd}$ reflection:
Forward wave $V_0^{(2)+} = V_0^{(0)} \cdot e^{-4\gamma L} \cdot \rho_L^2 \cdot \rho_s^2$,
Backward wave $V_0^{(2)-} = V_0^{(0)} \cdot e^{-4\gamma L} \cdot \rho_L^2 \cdot \rho_s$ $3^{rd}$ reflection:
Forward wave $V_0^{(3)+} = V_0^{(0)} \cdot e^{-6\gamma L} \cdot \rho_L^3 \cdot \rho_s^3$,
Backward wave $V_0^{(3)-} = V_0^{(0)} \cdot e^{-3\gamma L} \cdot \rho_L^2 \cdot \rho_s$ $\vdots$ $n^{th}$ reflection:
Forward wave $V_0^{(n)+} = V_0^{(0)} \cdot e^{-2n\gamma L} \cdot \rho_L^n \cdot \rho_s^n$,
Backward wave $V_0^{(n)-} = V_0^{(0)} \cdot e^{-2n\gamma L} \cdot \rho_L^n \cdot \rho_s^{n-1}$.

Therefore, $V_0$ can be expressed as:

$$V_0 = \sum_{n=0}^{\infty} V_0^{(n)} = V_0^{(0)} + \sum_{n=1}^{\infty} [V_0^{(n)+} + V_0^{(n)-}] \quad (1)$$

$$= V_0^{(0)} + \sum_{n=1}^{\infty} V_0^{(0)} \cdot e^{-2n\gamma L} \cdot \rho_L^n \cdot \rho_s^{n-1}(1 + \rho_s)$$

$$= V_s \cdot \frac{Z_0}{Z_0 + Z_s} \cdot \frac{1 + e^{-2\gamma L} \cdot \rho_L}{1 - e^{-2\gamma L} \cdot \rho_L \cdot \rho_s}.$$

Likewise, the voltage at the input of the load, denoted as $V_L$, can also be represented by a combination of multi-reflections:

1st reflection: Forward wave $V_L^{(1)+} = V_0^{(0)} \cdot e^{-\gamma L}$,
Backward wave $V_L^{(1)-} = V_0^{(0)} \cdot e^{-\gamma L} \cdot \rho_L$,
2nd reflection: Forward wave $V_L^{(2)+} = V_0^{(0)} \cdot e^{-3\gamma L} \cdot \rho_L \cdot \rho_s$,
Backward wave $V_L^{(2)-} = V_0^{(0)} \cdot e^{-3\gamma L} \cdot \rho_L^2 \cdot \rho_s$,
3rd reflection: Forward wave $V_L^{(3)+} = V_0^{(0)} \cdot e^{-5\gamma L} \cdot \rho_L^2 \cdot \rho_s^2$,
Backward wave $V_L^{(3)-} = V_0^{(0)} \cdot e^{-5\gamma L} \cdot \rho_L^3 \cdot \rho_s^2$,
.
.
.
$n^{th}$ reflection: Forward wave $V_L^{(n)+} = V_0^{(0)} \cdot e^{-(2n-1)\gamma L} \cdot \rho_L^{n-1} \cdot \rho_s^{n-1}$,
Backward wave $V_L^{(n)-} = V_0^{(0)} \cdot e^{-(2n-1)\gamma L} \cdot \rho_L^n \cdot \rho_s^{n-1}$.

Therefore, $V_L$ can be expressed as:

$$V_L = \sum_{n=1}^{\infty} V_L^{(n)} = \sum_{n=1}^{\infty} [V_L^{(n)+} + V_L^{(n)-}] \quad (2)$$

$$= \sum_{n=1}^{\infty} V_0^{(0)} \cdot e^{-(2n-1)\gamma L} \cdot \rho_L^{n-1} \cdot (1+\rho_L) \cdot \rho_s^{n-1}$$

$$= V_s \cdot \frac{Z_0}{Z_0 + Z_s} \cdot \frac{(1+\rho_L) \cdot e^{-\gamma L}}{1 - e^{-2\gamma L} \cdot \rho_L \cdot \rho_s}.$$

Both a TDR measurement system and a DSL application can be represented by the equivalent circuitry shown in FIG. 1. In the TDR case, $V_s$ is the pulse sent down to the line, $V_0$ is the measured TDR echo. The incident wave in $V_0$ is referred to as the near-end echo, the sum of the multi-reflections is referred to as the far-end echo. In a TDR measurement, the source impedance is usually the same as the characteristic impedance of the line, i.e. $Z_s = Z_0$, and the end of the line is usually open, i.e. $Z_L = \infty$, thus $\rho_s = 0$, $\rho_L = 1$, and the measured TDR echo can be written as:

$$V_0 = V_s \cdot \frac{Z_0}{Z_0 + Z_s} \cdot (1 + e^{-2\gamma L}), \quad (3)$$

which is a combination of the near-end echo and the backward wave in the 1st reflection.

In the DSL application case, $V_S$ and $Z_S$ represent the equivalent circuitry of the modem at the central office (CO), and $Z_L$ represents the equivalent circuitry of the modem at the customer premise (CPE). The obtainable data rate relates to the transfer function of the subscriber line, which is defined as:

$$H = \frac{V_L}{V_0}.$$

A modem is usually designed to have an impedance matching to the line, i.e. $Z_S = Z_0$, $Z_L = Z_0$, thus $\rho_s = 0$, $\rho_L = 0$, and $V_0$, $V_L$, and $H$ can be written as:

$$V_0 = V_s \cdot \frac{Z_0}{Z_0 + Z_s}, \quad (4)$$

$$V_L = V_s \cdot \frac{Z_0}{Z_0 + Z_s} \cdot e^{-\gamma L},$$

$$H = e^{-\gamma L}.$$

Because the imaginary part of $\gamma$ is a linear function of frequency, H has linear phase, the data rate is mainly determined by the modular of the transfer function.

Assume the transfer functions of two single-gauge straight lines to be $H_1$ and $H_2$. According to Eq. (4), $$H_1 = e^{-\gamma_1 L_1},$$

$$H_2 = e^{-\gamma_2 L_2},$$

where $\gamma_1$ and $L_1$ are the propagation constant and length of Line 1, respectively, and $\gamma_2$ and $L_2$ are the propagation constant and length of Line 2, respectively. These two lines will have the same data rate if:

$$\mathrm{real}(\gamma_1) \cdot L_1 = \mathrm{real}(\gamma_2) \cdot L_2, \quad (5)$$

where $\mathrm{real}(\cdot)$ is an operation to obtain a variable's real part.

Assume the TDR echoes of these two lines to be $V_{01}$ and $V_{02}$. According to Eq. (3), $$V_{01} = V_s \cdot \frac{Z_{01}}{Z_{01} + Z_s} \cdot (1 + e^{-2\gamma_1 L_1}),$$

$$V_{02} = V_s \cdot \frac{Z_{02}}{Z_{02} + Z_s} \cdot (1 + e^{-2\gamma_2 L_2}),$$

where $Z_{01}$ and $Z_{02}$ are the characteristic impedance of Line 1 and Line 2. Ignoring the difference in characteristic impedance between these two lines, i.e. $Z_{01} \approx Z_{02} = Z_0$, these two lines have similar near-end echoes, then according to Eq. (5), when these two lines have the same data rate, the following equation holds true:

$$\left| V_s \frac{Z_0}{Z_0 + Z_s} \right| \cdot e^{-2 \cdot \mathrm{real}(\gamma_1) \cdot L_1} = \left| V_s \frac{Z_0}{Z_0 + Z_s} \right| \cdot e^{-2 \cdot \mathrm{real}(\gamma_2) \cdot L_2}. \quad (6)$$

The left-hand side of Eq. (6) is the amplitude of the far-end TDR echo of Line 1; the right hand side is that of Line 2. Eq. (6) indicates that the far-end TDR echoes from two single-gauge straight lines, which have the same data rate, and have the same amplitude. Although this deduction is derived for certain values of $Z_s$ and $Z_L$, the conclusion is applicable for any $Z_s$ and $Z_L$.

An exemplary embodiment of the present invention is developed based on this deduction.

DETAILED DESCRIPTION

Figure 1:
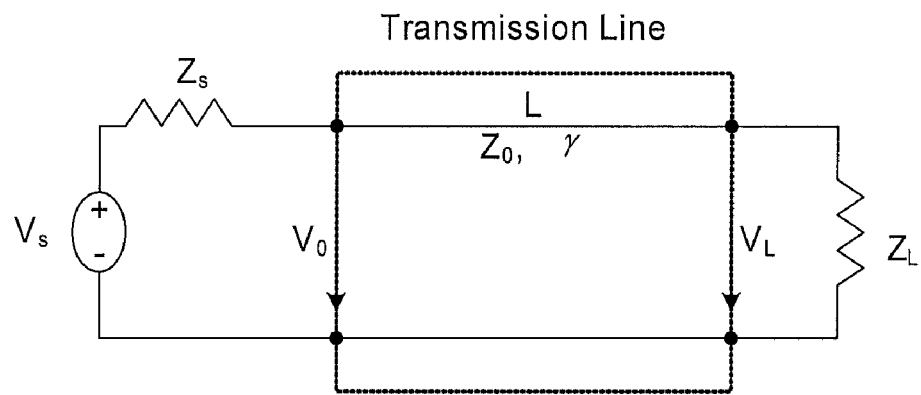
FIG. 1 illustrates a schematic representation of a transmission line system with a single-section straight loop.

The exemplary embodiments of this invention will be described in relation to acquiring, forwarding, if appropriate, and analyzing diagnostic information in a communications environment. However, it should be appreciated, that in general, the systems and methods of this invention would work equally well for any type of communication system in any environment.

The exemplary systems and methods of this invention will be described in relation to DSL modems and associated communication hardware, software and communication channels. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention, it should be appreciated however that the present invention may be practiced in a variety of ways beyond the specific details set forth herein. For example, the systems and methods of this invention can generally be applied to any type of communication system within any environment and for the detection of a data rate in any digital communications environment.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices, such as a modem, or collocated on a particular node of a distributed network, such as a telecommunications network. As will be appreciated from the following description, and for reasons of computational efficiency, the components of the system can be arranged at any location within a distributed network without affecting the operation of the system. For example, the various components can be located in a Central Office (CO or ATU-C) modem, a Customer Premises Modem (CPE or ATU-R), or some combination thereof. Similarly, the functionality of the system could be distributed between the modem and an associated computing device.

Furthermore, it should be appreciated that the various links, including communications line 20, connecting the elements can be wired or wireless links, or any combination thereof, or any other known or later developed element(s) that is capable of supplying and/or communicating data to and from the connected elements. The term module as used herein can refer to any known or later developed hardware, software or combination of hardware and software that is capable of performing the functionality associated with an element.

An exemplary embodiment of the present invention focuses on estimating data rates for asymmetric DSL (ADSL) service. However, and in general it is to be appreciated that this methodology can be applied to estimate data dates for any digital communications line.

ADSL has an upstream (US) band, within which data is transmitted from the CPE to the CO, from Tone 6 to Tone 31, and a downstream (DS) band, within which data is transmitted from the CO to the CPE, from Tone 32 to Tone 255. The tone interval can be, for example, 4312.5 Hz, with the ith tone corresponding to frequency (f) according to $f_i = i \times 4312.5$ (Hz). The TDR echo is measured by an ADSL CO modem within one frame, and is averaged over 10,000 frames. Each frame has 512 time samples with the sampling rate being 2208 kHz. All subscriber lines are equivalent to a single-gauge 26 AWG straight loop.

For a straight loop with a single gauge, Gauge x, let the propagation constant be $\gamma_x$, the physical length be $L_x$, then the equivalent equation given in Eq. (5) can be rewritten as:

$$\text{real}(\gamma_x) \cdot L_x = \text{real}(\gamma_{26}) \cdot L_{26}, \qquad (7)$$

where $\gamma_{26}$ and $L_{26}$ is the propagation constant and loop length of the corresponding 26 AWG equivalent loop, respectively. Let the equivalent loop length ratio between Gauge x and 26 AWG be $a_x$, such that $L_x = a_x \cdot L_{26}$, then Eq. (7) becomes:

$$\text{real}(\gamma_x) \cdot a_x = \text{real}(\gamma_{26}). \qquad (8)$$

Because the propagation constant varies across frequency, a fixed ratio across frequency has to be computed in a least square sense over a certain frequency band:

$$a_x(m, n) = \frac{\sum_{i=m}^{n} \text{real}[\gamma_x(f_i)] \cdot \text{real}[\gamma_{26x}(f_i)]}{\sum_{i=m}^{n} \{\text{real}[\gamma_x(f_i)]\}^2}, \quad (9)$$

where $f_i$ is the frequency of the ith tone, and m and n determine the frequency band under consideration. The equivalent ratio changes with m and n.

$a_{x(eq\_tdr)}$=equivalent loop length ratio corresponding to the same far-end echo (shape and amplitude only), then the equation for determining each ratio using Eq. (9) is $a_{x(eq\_us)} = a_x(m=6, n=31)$, $a_{x(eq\_ds)} = a_x(m=32, n=255)$, $a_{x(eq\_tdr)} = a_x(m=6, n=50)$.

Table 1 shows the equivalent ratios for both American loops (AWG) and European loops (metric). All ratios are determined using the wire primary parameters, characteristic impedance $Z_0$ and propagation constant $\gamma$, published in ITU G. 996.1.

TABLE 1

| | Equivalent coefficients | | | | |
|---|---|---|---|---|---|
| Gauge x | Equivalent-US-Rate Ratio $a_{x(eq\_us)}$ | Equivalent-DS-rate Ratio $a_{x(eq\_ds)}$ | Equivalent-TDR-echo Ratio $a_{x(eq\_tdr)}$ | Velocity Coefficient $V_x$ (sample/kft) | Time-shift Coefficient $\tau_x$ (ft/sample) |
| 0.32 mm | 0.8 | 0.8 | 0.8 | 6.3 | ANY |
| 0.4 mm | 1.0 | 1.0 | 1.0 | 6.9 | ANY |
| 0.5 mm | 1.5 | 1.3 | 1.5 | 7.5 | 30 |
| 0.63 mm | 2.2 | 1.6 | 2.0 | 6.9 | 40 |
| 0.9 mm | 3.3 | 2.2 | 3.0 | 6.5 | 30 |
| 19AWG | 3.2 | 2.3 | 2.8 | 6.9 | 20 |
| 22AWG | 2.0 | 1.6 | 1.9 | 7.1 | 30 |
| 24AWG | 1.4 | 1.27 | 1.4 | 7.1 | 40 |
| 26AWG | 1.0 | 1.0 | 1.0 | 7.0 | ANY |

Figure 2:
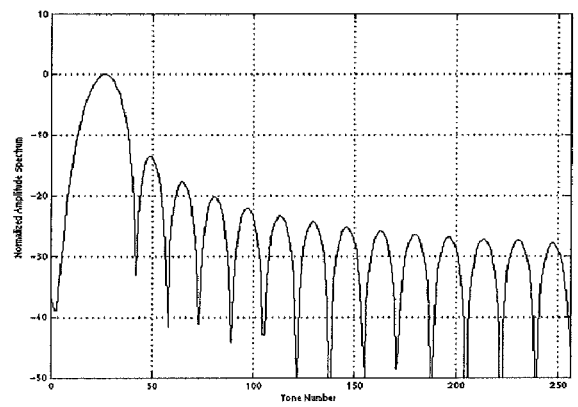
FIG. 2 illustrates the exemplary spectrum of the TDR pulse used according to an exemplary embodiment of this invention.
Figure 3:
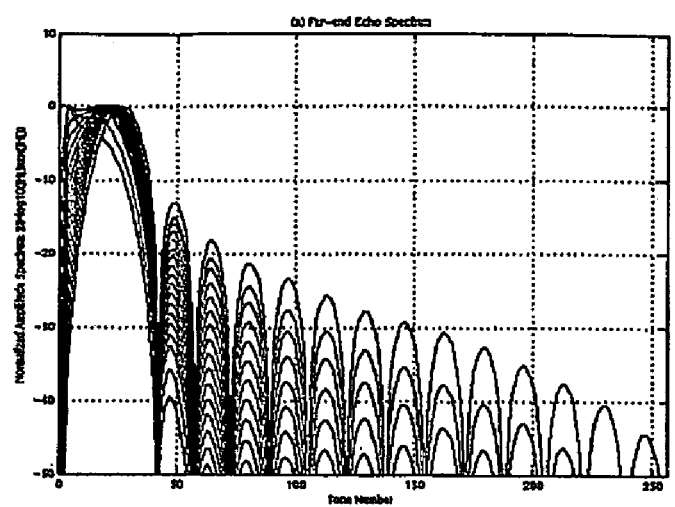
FIG. 3 illustrates exemplary spectra of the far-end echoes from 26 AWG straight loops with various lengths according to this invention.
Figure 3:
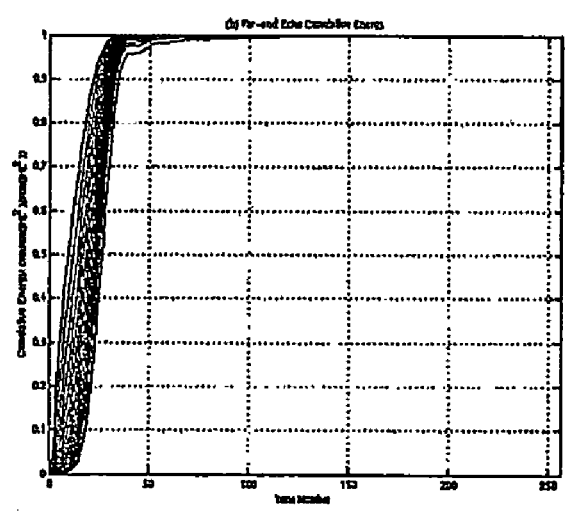

Because a subscriber line provides more attenuation on higher frequency components than on lower frequency components, the measured TDR echo is dominated by low frequency components. The spectrum of the pulse also influences the frequency band of the measured TDR echo. FIG. 2 shows the spectrum of the TDR pulse used in this invention. FIG. 3 shows the spectra of the far-end echoes from 26 AWG straight loops with various lengths. Eighteen curves are plotted in each plot. Each curve corresponds to a 26 AWG loop with a certain length. The loop length varies from 1 kft to 18 kft in 1 kft step. It can be seen that the far-end echo is dominated by low frequency components, and more than 95% of the energy is distributed below Tone 50 ($\approx$220 kHz). Since there is not much energy below Tone 6, the TDR band is set in this exemplary embodiment from Tone 6 to 50, however, the TDR band can be varied as appropriate.

Figure 4A:
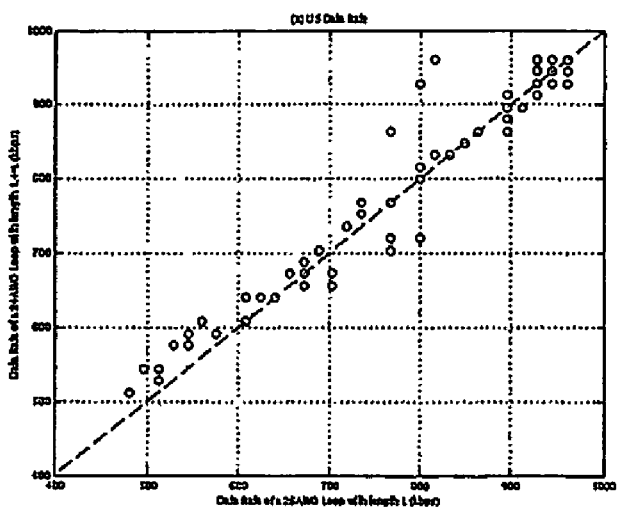
FIG. 4a illustrates a data rate comparison between equivalent-data-rate loops for the US data rate according to this invention.
Figure 4B:
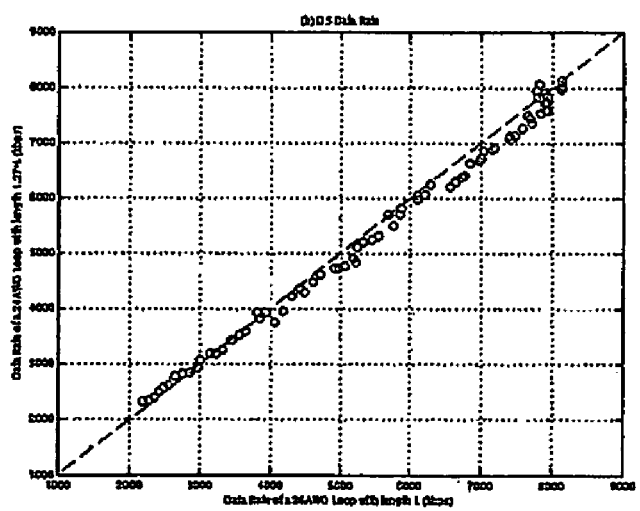
FIG. 4b illustrates a data rate comparison between equivalent-data-rate loops for the DS data rate according to this invention.

As discussed above, the US band of an ADSL application is from Tone 6 to Tone 31, the DS band is from Tone 32 to Tone 255, so the equivalent ratio for the US case is different from the DS case. Consider the difference in frequency band among the US, DS, and TDR case, define:

$a_{x(eq\_us)}$=equivalent loop length ratio corresponding to the same US data rate, $a_{x(eq\_ds)}$=equivalent loop length ratio corresponding to the same DS data rate, and FIG. 4 shows the data rate comparison between 24 AWG and 26 AWG equivalent-data-rate loops. More specifically, FIG. 4a illustrates the data rate comparison between equivalent US data rate loops and FIG. 4b illustrates data rate comparison between equivalent DS data rate loops. According to Table 1, the equivalent-US-rate ratio is 1.4; the equivalent-DS-rate ratio is 1.27. FIG. 4(a) shows the US data rates of 24 AWG loops (length=L) versus that of 26 AWG equivalent-US-rate loops (length=L/1.4). FIG. 4(b) shows the DS data rates of 24 AWG loops (length=L) versus that of 26 AWG equivalent-DS-rate loops (length=L/1.27). It can be seen that the equivalent loops do have very similar data rate. The averaged data rate difference between equivalent loops is about 30 kbps for the US case, and 160 kbps for the DS case.

Figure 5A:
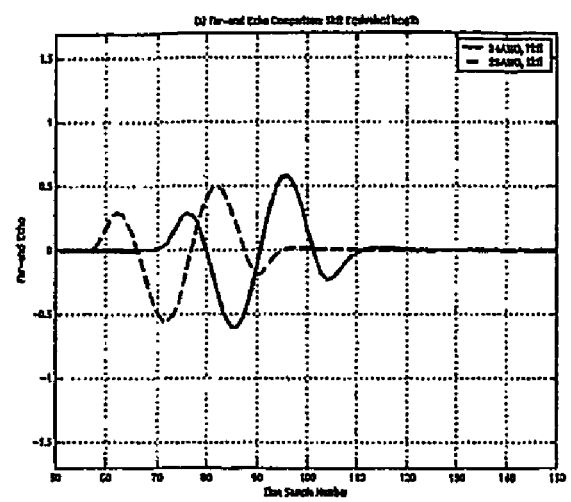
FIG. 5a illustrates the far-end echo comparison between 24 AWG and 26 AWG equivalent-TDR-echo loops where the 26 AWG equivalent loop length=5 kft. according to this invention.
Figure 5B:
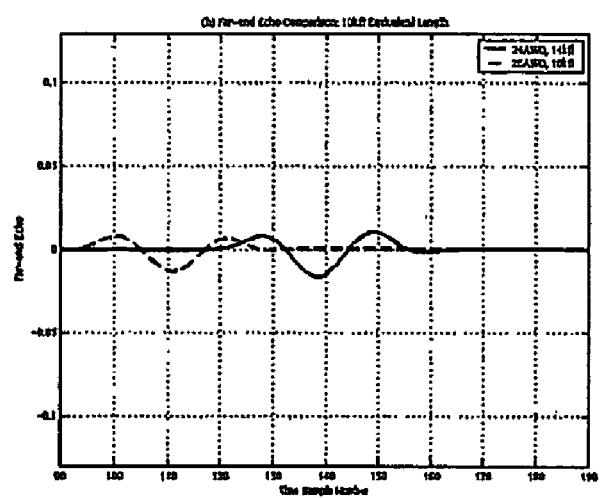
FIG. 5b illustrates the far-end echo comparison between 24 AWG and 26 AWG equivalent-TDR-echo loops where the 26 AWG equivalent loop length=10 kft. according to this invention.

FIG. 5 illustrates the far-end echo comparison between 24 AWG and 26 AWG equivalent-TDR-echo loops. According to Table 1, the equivalent-TDR-echo ratio is 1.4. FIG. 5a shows the comparison between a 26 AWG 5 kft loop and a 24 AWG 7 kft loop (5*1.4=7). FIG. 5b shows the comparison between a 26 AWG 10 kft loop and a 24 AWG 14 kft loop (10*1.4=14). It can be seen that between the equivalent loops, the amplitude and the shape of the far-end echoes are very similar; while the time delays are different—the 24 AWG loop has a longer delay than the 26 AWG loop.

The equivalent ratios given in Table 1 are computed under the assumption that the difference in characteristic impedance $Z_0$ can be ignored. The comparisons shown in FIG. 4 and in FIG. 5 indicate this approximation is reasonable.

Figure 6:
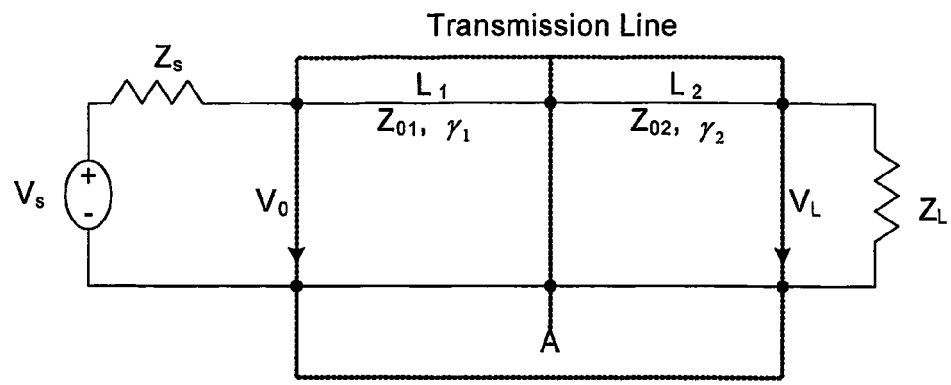
FIG. 6 illustrates schematically a representation of a transmission line system with a 2-section straight loop.

Due to the existence of gauge changes within a mixed-gauge loop, the mixed-gauge case is more complicated than the single gauge case. An exemplary transmission line system with a two-section mixed-gauge loop is schematically represented in FIG. 6. It is similar to that shown in FIG. 1. The only difference is the line has two sections instead of one section.

Let the characteristic impedance, propagation constant, and loop length of the first section be $Z_{01}$, $\gamma_1$ and $L_1$, and that of the second section be $Z_{02}$, $\gamma_2$ and $L_2$. The gauge change point is denoted as A, and the reflection coefficient at A as $\rho_A$, where:

$$\rho_A = \frac{Z_{02} - Z_{01}}{Z_{02} + Z_{01}}.$$

According to the transmission line theory, the wave propagation within this two-section loop can be represented as follows:

Incident Wave:

$$V_0^{(0)} = \frac{Z_{01}}{Z_s + Z_{01}} V_s.$$

$1^{st}$ trip, wave at A:
Forward wave $V_{A12}^{(1)+} = V_0^{(0)} \cdot e^{-\gamma_1 L_1}$
Backward wave $V_{A12}^{(1)-} = V_0^{(0)} \cdot e^{-\gamma_1 L_1} \cdot \rho_A$ $1^{st}$ trip, incident from Section 1 to Section 2:

$$V_{A12}^{(1)} = V_{A12}^{(1)+} + V_{A12}^{(1)-} = V_0^{(0)} \cdot e^{-\gamma_1 L_1} \cdot (1 + \rho_A)$$

$1^{st}$ trip, return from the end of Section 2 to A:
Forward wave $V_{A21}^{(1)+} = V_{A12}^{(1)} \cdot e^{-2\gamma_2 L_2} \cdot (-\rho_A) \cdot \rho_L$
Backward wave $V_{A21}^{(1)-} = V_{A12}^{(1)} \cdot e^{-2\gamma_2 L_2} \cdot \rho_L$ $1^{st}$ trip, incident from Section 2 to Section 1:

$$V_{A21}^{(1)} = V_{A21}^{(1)+} + V_{A21}^{(1)-}$$

$1^{st}$ reflection at the source output:

$$V_0^{(1)} = [V_{A12}^{(1)-} \cdot e^{-\gamma_1 L_1} + V_{A21}^{(1)} \cdot e^{-\gamma_1 L_1}] \cdot (1 + \rho_s) \quad (10)$$
$$= [V_{A12}^{(1)-} \cdot e^{-\gamma_1 L_1} + (V_{A21}^{(1)+} + V_{A21}^{(1)-}) \cdot e^{-\gamma_1 L_1}] \cdot (1 + \rho_s)$$
$$= [V_0^{(0)} \cdot e^{-2\gamma_1 L_1} \cdot \rho_A + V_0^{(0)} \cdot e^{-2\gamma_1 L_1 - 2\gamma_2 L_2} \cdot (1 - \rho_A^2) \cdot \rho_L] \cdot (1 + \rho_s)$$
$$= V_s \frac{Z_{01}}{Z_{01} + Z_s} \cdot e^{-2\gamma_1 L_1} \cdot \rho_A \cdot (1 + \rho_s) +$$
$$V_s \frac{Z_{01}}{Z_{01} + Z_s} \cdot e^{-2\gamma_1 L_1 - 2\gamma_2 L_2} \cdot (1 - \rho_A^2) \cdot \rho_L \cdot (1 + \rho_s)$$

When each section is not too short (e.g., $L_1$, $L_2 \geq 1000$ ft), higher order reflections can be ignored, thus the $1^{st}$ order reflection given by Eq. (10) is a reasonable approximation of the overall far-end echo. Eq, 10 shows that the far-end echo includes two dominant reflections, one is from the gauge change (the first term in Eq. (10)), the other is from the end of the line (the second term in Eq. (10)). Because the reflection coefficient at the gauge change, $\rho_A$, is usually very small, $\rho_A^2$ is even smaller, the reflection from the end of the line can be simplified to:

$$V_s \cdot \frac{Z_{01}}{Z_{01} + Z_s} \cdot e^{-2\gamma_1 L_1 - 2\gamma_2 L_2} \cdot \rho_L \cdot (1 + \rho_s). \quad (11)$$

Assume the equivalent-TDR ratio of a 26 AWG loop to be $a_{1(eq\_tdr)}$ for Section 1, and $a_{2(eq\_tdr)}$ for Section 2. Eq. (11) indicates that if $Z_{01}$ is similar to the characteristic impedance of a 26 AWG loop, the reflection from the end of the mixed-gauge loop has a similar shape and amplitude as the far-end echo from a 26 AWG loop with length $$L_{eq\_tdr} = L_1/a_{1(eq\_tdr)} + L_2/a_{2(eq\_tdr)}.$$

Figure 7A:
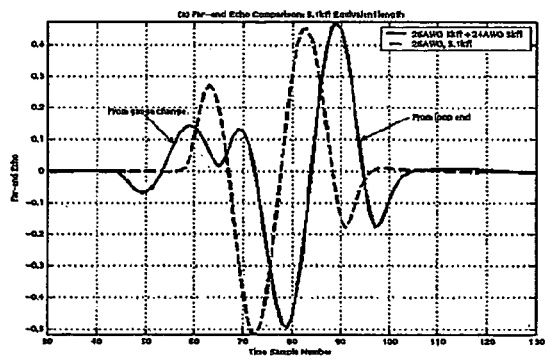
FIGS. 7a and 7b are a far-end echo comparison between mixed-gauge loops and 26 AWG equivalent loops according to this invention.
Figure 7B:
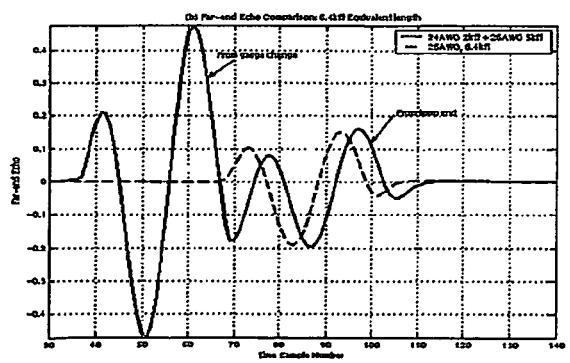

FIG. 7 shows far-end echo comparisons between a mixed-gauge loop and its 26 AWG equivalent-TDR-echo loop. More specifically, FIG. 7a shows the comparison between a mixed-gauge loop, which has a first section of 3 kft 26 AWG and a second section of 3 kft 24 AWG, and a 26 AWG straight loop with a length of 5.1 kft (3+3/1.4=5.1). FIG. 7b shows the comparison between a mixed-gauge loop, which has a first section of 2 kft 24 AWG and a second section of 5 kft 26 AWG, and a 26 AWG straight loop with a length of 6.4 kft (2/1.4+5=6.4). FIG. 7(a) suggests that in the mixed-gauge case, although part of the far-end echo is the return from the gauge change, the return from the end of the loop is very similar to the far-end echo from the equivalent straight loop. The sign of the return from the gauge change is the inverse of the return from the end of the loop. This is consistent with the fact that the gauge change is from 26 AWG to 24 AWG. Because the characteristic impedance of a 24 AWG loop is smaller than that of a 26 AWG loop, the reflection coefficient at the gauge change is negative, which results in a negative return.

Similar to FIG. 7a, FIG. 7b also suggests that in the mixed-gauge case, although part of the far-end echo is the return from the gauge change, the return from the end of the loop is very similar to the far-end echo from the equivalent straight loop. However, now the gauge change is from 24 AWG to 26 AWG, the reflection coefficient at the gauge change is positive, so the return from the gauge change is somewhat similar to the return from the end of the loop. Therefore, it is expected that the return from the gauge change may have more influence on 24 AWG+26 AWG mixed-gauge case than on 26 AWG+24 AWG mixed-gauge case.

Assume $Z_s = Z_{01}$, $Z_L = Z_{02}$, the voltage at the load input, $V_L$, is:

$$V_L = V_{A12}^{(1)} \cdot e^{-\gamma_2 L_2} = V_0^{(0)} \cdot e^{-\gamma_1 L_1 - \gamma_2 L_2} \cdot (1 + \rho_A),$$

therefore, the transfer function of the mixed-gauge line is:

$$H = \frac{V_L}{V_0} = e^{-\gamma_1 L_1 - \gamma_2 L_2} \cdot (1 + \rho_A). \quad (12)$$

As mentioned before, the reflection coefficient at the gauge change, $\rho_A$, is usually very small, thus the transfer function can be simplified to:

$$H \approx e^{-\gamma_1 L_1 - \gamma_2 L_2}. \quad (13)$$

Assume the equivalent US and DS ratios to a 26 AWG loops to be $a_{1(eq\_us)}$ and $a_{1(eq\_ds)}$ for Section 1, and $a_{2(eq\_us)}$ and $a_{2(eq\_ds)}$ for Section 2. Eq. 13 indicates that the 2-section loop has the same data rate as a 26 AWG straight loop with length:

$$L_{eq\_us} = L_1/a_{1(eq\_us)} + L_2/a_{2(eq\_us)},$$

and has the same DS data rate as a 26 AWG straight loop with length:

$$L_{eq\_ds} = L_1/a_{1(eq\_ds)} + L_2/a_{2(eq\_ds)}.$$

Figure 8A:
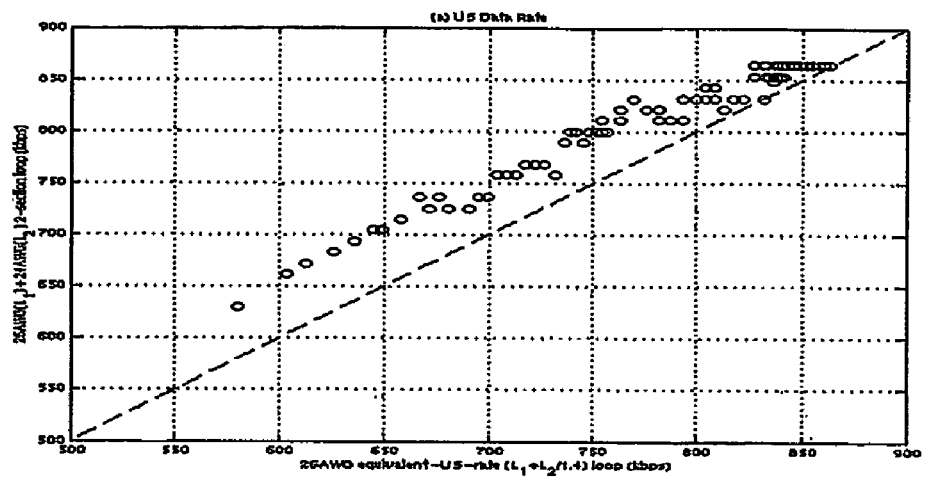
FIGS. 8a and 8b illustrate a data rate comparison between 2-section mixed-gauge loops and their 26 AWG equivalent-data-rate loops for the US data rate and DS data rate, respectively, according to this invention.
Figure 8B:
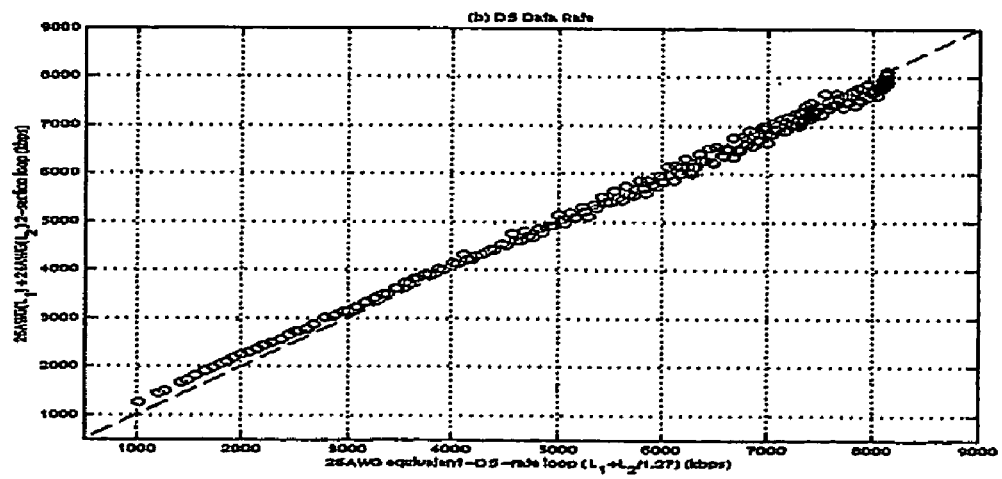

FIG. 8 shows data rate comparison between 2-section mixed-gauge loops and their 26 AWG equivalent-data-rate loops. The first section of each loop is 26 AWG and the second section is 24 AWG. Each section varies from 1 kft to 9 kft in 500 ft step. It can be seen that the approximation given in Eq. (13) is reasonable.

Figure 9A:
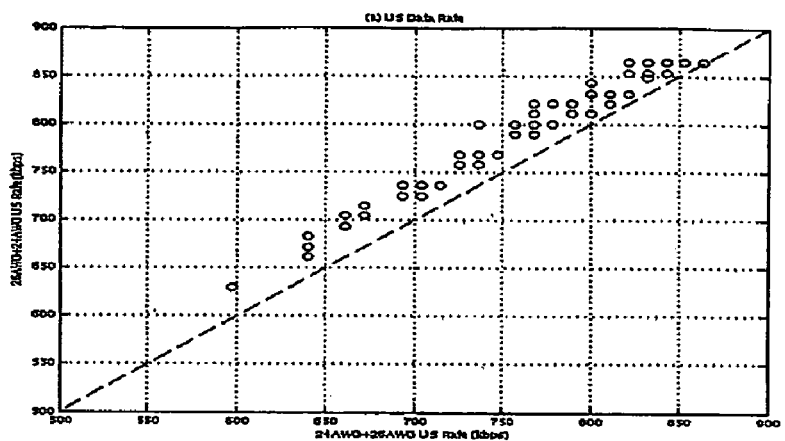
FIGS. 9a and 9b illustrate the data rate comparison between 26 AWG+24 AWG loops and 24 AWG+26 AWG loops for the US data rate and the DS date rate, respectively, according to this invention.
Figure 9B:
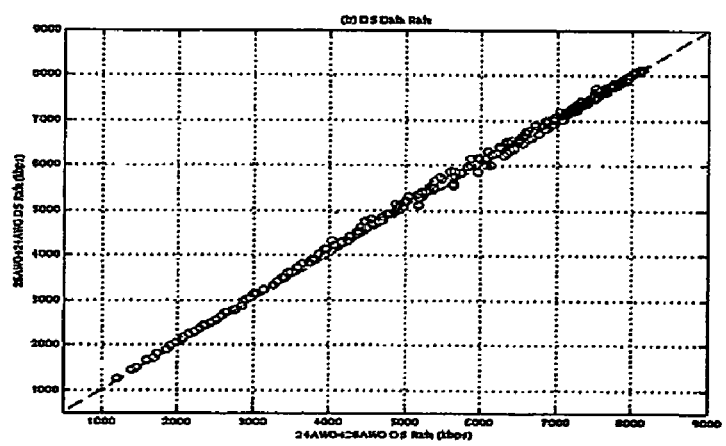

FIG. 9 illustrates the data rate comparison between 2-section loops with different gauge change order: one case is from 26 AWG to 24 AWG; the other case is from 24 AWG to 26 AWG. It can be seen that the data rates of these two cases are very similar. According to Eq. (12), the transfer function of the 26 AWG+24 AWG case be written as:

$$H_{26AWG+24AWG} = e^{-\gamma_{26}L_{26} - \gamma_{24}L_{24}} \cdot (1+\rho_A),$$

and the 24 AWG+26 AWG case be written as:

$$H_{24AWG+26AWG} = e^{-\gamma_{24}L_{24} - \gamma_{26}L_{26}} \cdot (1-\rho_A),$$

thus the difference between these two cases is the sign of the reflection coefficient. The similarity in data rates between these two cases indicates the reflection at the gauge change has no significant influence on the data rates. Therefore, Eq. (13) is a reasonable approximation of the transfer function of a 2-section loop.

Although Eq. (11) and Eq. (13) are derived for 2-section loops, they hold true for multi-section loops as well. For a loop with n sections, assume the physical length, equivalent US ratio, equivalent DS ratio, and equivalent TDR ratio for the ith section (i=1-n) to be $L_i$, $a_{i(eq\_us)}$, $a_{i(eq\_ds)}$, and $a_{i(eq\_tdr)}$, respectively. Let the 26 AWG equivalent US length, equivalent DS length, and equivalent TDR length be $L_{eq\_us}$, $L_{eq\_ds}$, and $L_{eq\_tdr}$, respectively, then:

$$L_{eq\_us} = \sum_{i=1}^{n} L_i / a_{i(eq\_us)},$$

$$L_{eq\_ds} = \sum_{i=1}^{n} L_i / a_{i(eq\_ds)},$$

$$L_{eq\_tdr} = \sum_{i=1}^{n} L_i / a_{i(eq\_tdr)}.$$

As mentioned above, the ultimate goal of the equivalent loop estimation is to predict the data rate for a given loop. The equivalent length estimated from the measured TDR echo is the equivalent TDR length. According to Table 1, the equivalent TDR ratio and the equivalent data rate ratio, especial in the DS case, are different, thus the data rate predicted using the equivalent TDR length would be inaccurate. In an exemplary embodiment of the present invention, the equivalent-data-rate length is derived from the estimated equivalent TDR length and the time delay between the measured far-end echo and the equivalent far-end echo.

The time delay of a far-end echo is determined by the physical length of the loop and the propagation velocity of the traveling wave. Based on the transmission line theory, the time delay can be represented as:

$$\text{Delay} = \frac{2L}{V_p},$$

where L is the physical length of the loop, and $V_p$ is the propagation velocity. Since a far-end echo is a round trip return, the numerator is double loop length. The propagation velocity of a transmission line relates to the imaginary part of the propagation constant γ, $$V_p = \frac{\omega}{imag(\gamma)},$$

where ω is the radian frequency (ω=2πf), and imag(γ) is the imaginary part of γ. Because a subscriber line usually has a propagation constant whose imaginary part is a straight line across frequency, the propagation velocity is a constant across frequency. Thus, the propagation velocity of Gauge x, denoted as $V_x$, can be computed from the propagation constant as in the following $$V_x = \frac{2\pi \cdot \Delta f}{\frac{1}{n-m}\{imag[\gamma_x(f_n)] - imag[\gamma_x(f_m)]\}}, \quad (14)$$

where $f_i$ is the frequency of the ith tone, $\gamma_x$ is the propagation constant of Gauge x, Δf is the tone interval, which in the ADSL case is 4312.5 Hz, and m and n correspond to the frequency range of the TDR echo. In this specific case, m=6, n=50. The unit for $V_x$ is "m/s".

The propagation velocity can be expressed in terms of number of samples per kft. For Gauge x, define number of samples per kft as velocity coefficient $\lambda_x$, then:

$$\lambda_x = \frac{2 \times 1000 \text{ (ft)}}{3.2808 \text{ (ft/m)}} \cdot \frac{f_s}{V_x},$$

where $f_s$ is the sampling rate of the TDR measurement system. The unit for $\lambda_x$ is "Time Sample/kft". The velocity coefficient of AWG loops and metric loops are listed in Table 1 for $f_s$=2208 kHz. It can be seen that a 24 AWG loop has almost the same velocity coefficient as a 26 AWG loop, about 7 samples/kft. Consider the equivalent TDR ratio between a 26 AWG loop and a 24 AWG loop is 1.4, the delay difference, or the time shift, between a 24 AWG loop (length=L) and its 26 AWG equivalent loop (length=L/1.4) is L×7−L/1.4×7=2×L, where L is in kft. For the far-end echoes shown in FIG. 5 and FIG. 7, the theoretical time shifts between the measured far-end echo and its TDR-equivalent loop are:

FIG. 5(*a*): 24 AWG length=7 kft, time shift=14 samples;
FIG. 5(*b*): 24 AWG length=10 kft, time shift=28 samples;
FIG. 7(*a*): 26 AWG length=3 kft, 24 AWG length=3 kft, time shift=6 samples;
FIG. 7(*b*): 24 AWG length=2 kft, 26 AWG length=5 kft, time shift=4 samples.

The time shifts given above are consistent with the plots given in FIGS. 5 and 7. This indicates the time shift contains the information about the physical length of a given loop.

For a straight loop with a single gauge, Gauge x, if its physical length is $L_x$, then the equivalent-TDR length $L_{eq\_tdr}=L_x/a_{x(eq\_tdr)}$. Let the velocity coefficient of Gauge x be $\lambda_x$, and that of 26 AWG be $\lambda_0$, then the time shift between the measured echo and the equivalent echo, denoted as s, is:

$$s = L_x \cdot \lambda_x - L_{eq\_tdr} \cdot \lambda_0,$$

where the unit of s is number of samples. The physical length, $L_x$, can be rewritten as:

$$L_x = \frac{s}{\lambda_x - \lambda_0/a_{x(eq\_tdr)}}. \quad (15)$$

Eq. (15) shows that once Gauge x is known, the physical length of a straight loop, $L_x$, can be obtained directly from the time shift s.

Figure 10:
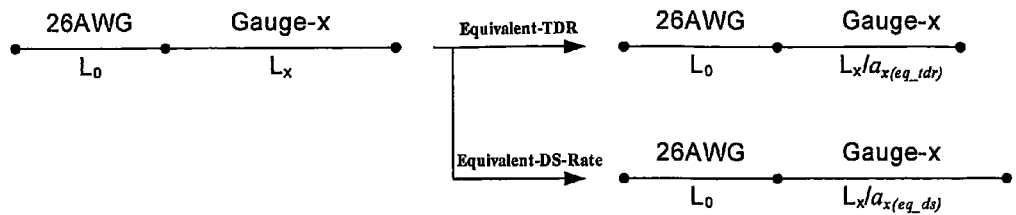
FIG. 10 illustrates a straight loop with mixed gauges according to this invention.

For a straight loop mixed with 26 AWG and Gauge x, as illustrated in FIG. 10, assume the length of the 26 AWG section to be $L_0$ and that of Gauge x to be $L_x$. If we know $\lambda_0$, $\lambda_x$, $a_{x(eq\_tdr)}$, $a_{x(eq\_ds)}$, the equivalent-TDR length $L_{eq\_tdr}$, and the time shift s, then the equivalent-DS-rate length, denoted as $L_{eq\_ds}$, can be obtained by solving the following equations:

$$\begin{cases} L_{eq\_tdr} = L_0 + L_x/a_{x(eq\_tdr)} \\ L_{eq\_ds} = L_0 + L_x/a_{x(eq\_ds)} \\ L_x = s/(\lambda_x - \lambda_0/a_{x(eq\_tdr)}) \end{cases}$$

The solution is:

$$L_{eq\_ds} = L_{eq\_tdr} + s \cdot \frac{1}{\lambda_x - \lambda_0/a_{x(eq\_tdr)}} \cdot \left[\frac{1}{a_{x(eq\_ds)}} - \frac{1}{a_{x(eq\_tdr)}}\right]. \quad (16)$$

Define the time-shift coefficient for Gauge x be $\tau_x$, i.e.:

$$\tau_x = \frac{1}{\lambda_x - \lambda_0/a_{x(eq\_tdr)}} \cdot \left[\frac{1}{a_{x(eq\_ds)}} - \frac{1}{a_{x(eq\_tdr)}}\right],$$

then Eq. (16) can be written as:

$$L_{eq\_ds} = L_{eq\_tdr} + s \cdot \tau_x. \quad (17)$$

Eq. (17) shows that the equivalent-data-rate length, $L_{eq\_ds}$ can be determined based on the equivalent-TDR-echo length, $L_{eq\_tdr}$, the time shift s, and the time shift coefficient $\tau_x$. Table 1 lists the time shift coefficients of both AWG wires and metric wires. Because for 0.4 mm and 26 AWG wires, the time shift is 0 for any loop length, in other words, the equivalent-data length, the equivalent-TDR-echo length and the physical length are the same for these wires, the time-shift coefficient for these two gauges can be any value. Eq. (17) indicates that if the time shift coefficient, $\tau_x$, is a constant across all gauges, the relationship given by Eq. (17) would be independent of Gauge x. However, Table 1 shows the time-shift coefficients are not identical across gauge. Since the most popular gauges used in the field are 24 AWG and 26 AWG in North American, and 0.4 mm, 0.5 mm and 0.63 mm in Europe, we average the time shift coefficient across 24 AWG, 0.5 mm and 0.63 mm, the rounded average is $\tau_{mean} \approx 40$.

Because the equivalent-US-rate ratio is very similar to the equivalent-TDR ratio, no correction is made for US rate prediction.

As discussed, the goal of the equivalent estimation method is to predict the data rate for a given subscriber line based on a TDR measurement. The input of the method is a measured TDR echo, the output is the predicted DS and US data rates. The intermediate steps include the equivalent TDR length estimation and the length correction for data rate prediction. In order to predict the data rate correctly, this exemplary method needs to know the data rate versus loop length curve of 26 AWG straight loops. The detailed procedure is discussed below in relation to FIGS. 11 and 12.

Figure 11:
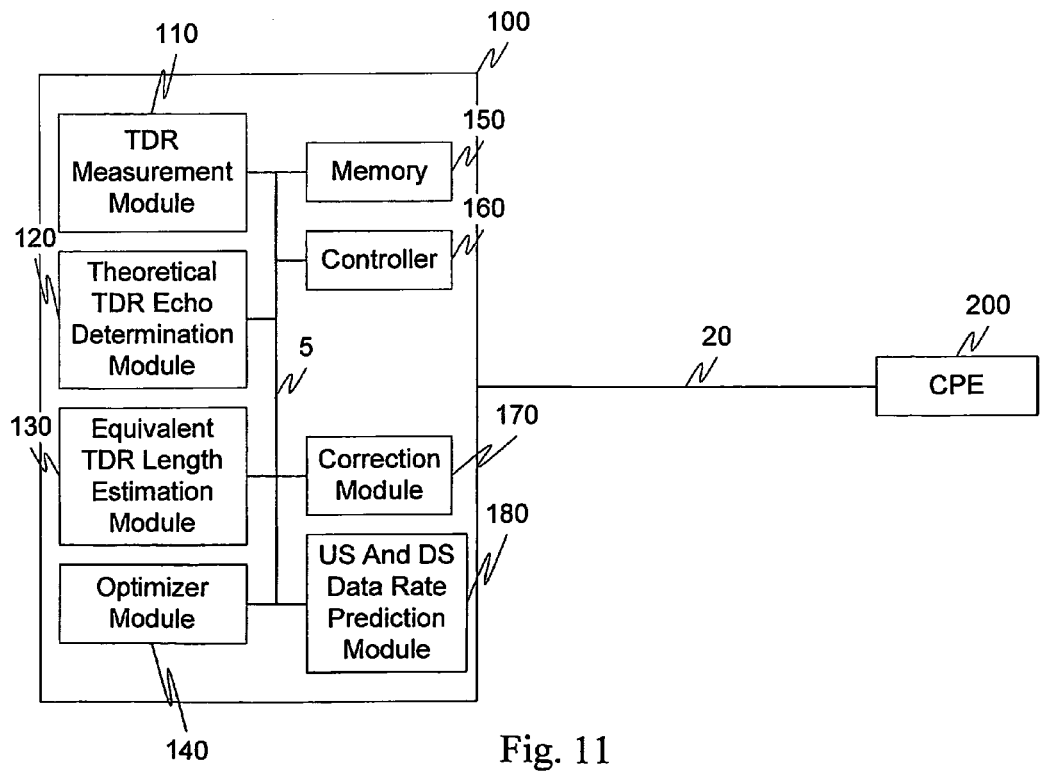
FIG. 11 illustrates an exemplary channel capacity estimator 100 according to this invention.

FIG. 11 illustrates an exemplary channel capacity estimator 100 according to this invention. The estimator 100 comprises a TDR measurement module 110, a theoretical TDR echo determination module, an equivalent TDR length estimation module 130, an optimizer module 140, a memory 150, a controller 160, a correction module 170 and an US and DS data rate prediction module 180, all interconnected by link 5. The estimator 100 is connected to a line 20, which is in turn connected to a modem 200, such as a DSL modem.

In operation, the TDR measurement module 110 reads a previously measured or determines the measured TDR echo, (echo_measured(i)), where i is the time sample index. In the case of ADSL, one flame has 512 samples, thus i=0-511.

Next, the theoretical TDR echo determination module 120 determines the theoretical TDR echoes for 26 AWG straight loops with various loop lengths.

Let the loop length of the nth loop be $L_n$, n=1~N, where N is total number of loops, the corresponding theoretical TDR echo be echo_model$_n$(i), then:

$$\text{echo\_model}_n(i) = IFFT\left[\frac{Z_0/\tanh(\gamma L_n)}{Z_s + Z_0/\tanh(\gamma L_n)} V_s\right],$$

where $Z_0$ and $\gamma$ are the characteristic impedance and propagation constant of a 26 AWG loop, $Z_s$ and $V_s$ are the output impedance and voltage of the source.

Then, the equivalent TDR length estimation module 130 estimates the equivalent TDR length. This is achieved by:

(1) Finding the best time shift between the measured far-end echo and the theoretical far-end echo of the nth loop by solving the following optimization problem:

$$\min_m \sum_{j=0}^{WN-1} [\text{echo\_measured}(j+m) - \text{echo\_model}_n(j)]^2,$$

where m is a variable representing the time shift, which varies in a certain region with a one-sample step. The minimum error across m is denoted as E(n), and the corresponding best shift as S(n).

(2) Let n=n+1. If n≦N, go to (1); otherwise go to (3).

(3)

$$\text{Let } n^* = \min_n E(n),$$

then the equivalent TDR length, $L_{eq\_tdr}$, is:

$$L_{eq\_tdr} = L_{n^*},$$

and the corresponding time shift, denoted as s*, is:

$$s^* = S(n^*).$$

The correction module 170 then corrects the equivalent-TDR length for data rate prediction.

According to the analysis given above, the equivalent-US-rate length and the equivalent-DS-rate length relate to $L_{eq\_tdr}$ and s*:

$$L_{eq\_us} = L_{eq\_tdr}, \text{ and}$$

$$L_{eq\_ds} = L_{eq\_tdr} + s^* \cdot \tau_{mean} = L_{eq\_tdr} + s^* \cdot 40 \text{(ft/sample)}.$$

The US and DS data rate prediction module 180 then predicts the US and DS data rates, which can be one or more of output and/or displayed on a display device (not shown), by letting the US rate-length function for 26 AWG loops be $\text{Rate}_{US}(L)$, and the DS rate-length function be $\text{Rate}_{DS}(L)$, then the US rate, denoted as US_Rate, and the DS rate, denoted as DS_Rate, are:

$$\text{US\_Rate} = \text{Rate}_{US}(L_{eq\_us}), \text{ and}$$

$$\text{DS\_Rate} = \text{Rate}_{DS}(L_{eq\_ds}).$$

Figure 12A:
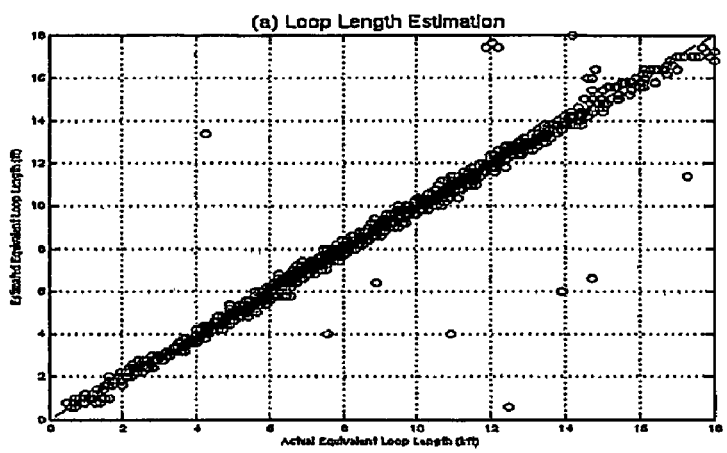
FIGS. 12a and 12b illustrate the loop length estimation results, with FIG. 12a showing a comparison between the actual and the estimated lengths, and FIG. 12b showing the distribution of the estimation error according to this invention.
Figure 12B:
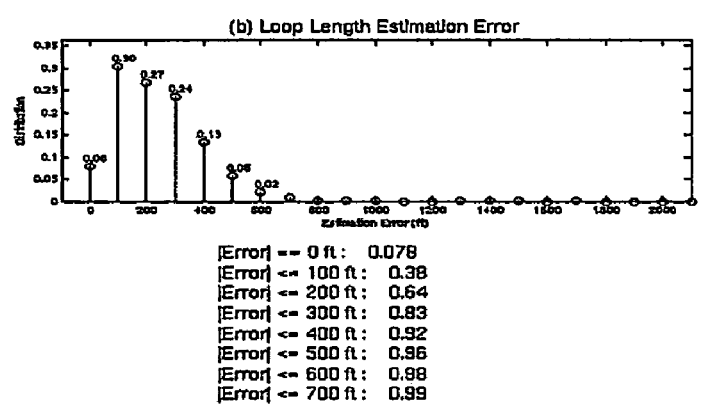

The present invention has been tested on several different CO modems that have TDR functionality. The results from one of the modems are given below. All of the loops tested are listed in Table 2. The total number of loops is 1291. All loops are straight loops with a single section or up to four sections. Both American wires and European wires are tested. FIG. 12 shows the estimation results on equivalent-TDR length, with FIG. 12a showing the estimated length versus theoretical length, which is calculated using Table 1, and FIG. 12b showing the distribution of the estimation error.

Figure 13A:
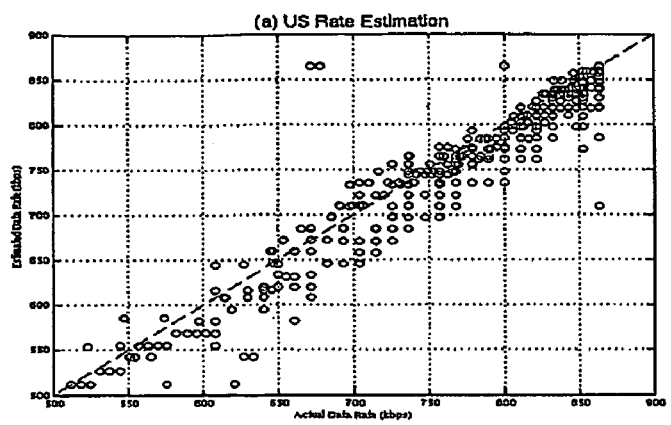
FIGS. 13a and 13b illustrate the US data rate estimation results, with FIG. 13a showing a comparison between the actual and the estimated US date rates, and FIG. 13b showing the distribution of the estimation error according to this invention.
Figure 13B:
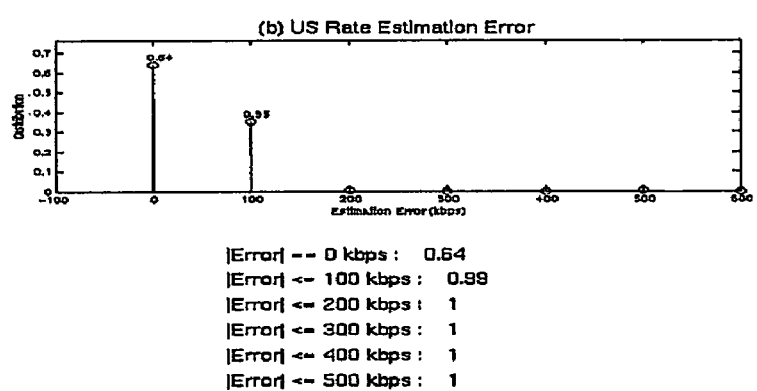

FIG. 13 shows the estimation results on US data rate, with FIG. 13a showing the estimated US rate versus the measured data rate, i.e. the actual data rate when connecting a CO-CPE modem pair using the given loop, and FIG. 13b showing the distribution of the error on US rate estimation.

Figure 14A:
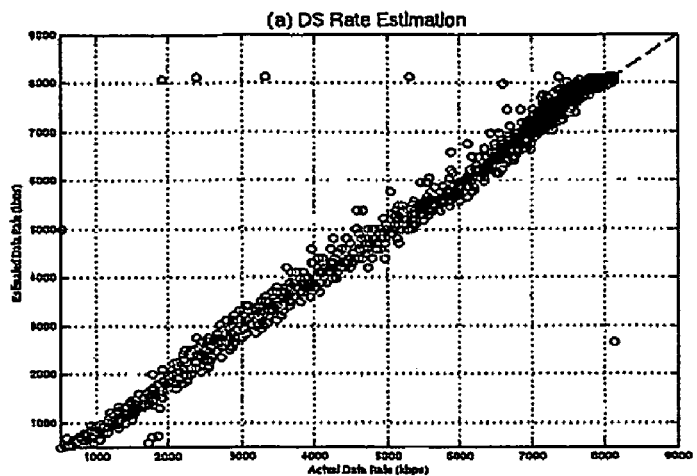
FIGS. 14a and 14 b illustrate the DS data rate estimation results, with FIG. 14a showing a comparison between the actual and the estimated DS date rates, and FIG. 14b showing a distribution of the estimation error according to this invention.
Figure 14B:
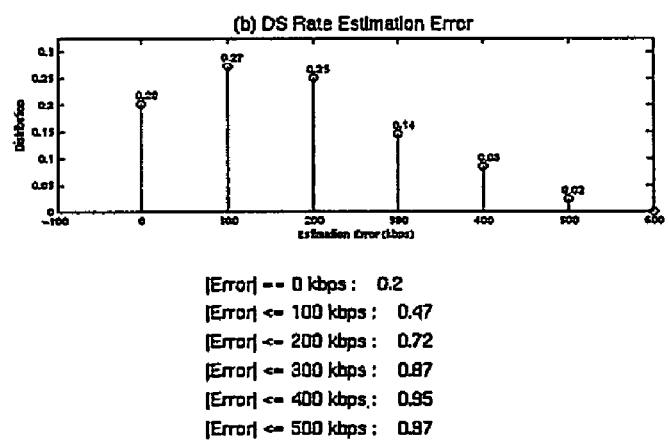

FIG. 14 shows the estimation results on DS data rate, with FIG. 14a showing the estimated DS rate versus the measured data rate, i.e. the actual data rate when connecting a CO-CPE modem pair using the given loop, and FIG. 14b showing the distribution of the error on DS rate estimation.

TABLE 2

A list of exemplary tested loops

| No. of sections | Configuration | Length | No. of loops |
|---|---|---|---|
| 1-section | 24AWG (L) | L = 1 kft – 22 kft/1 kft | 22 |
| | 26AWG (L) | L = 1 kft – 18 kft/100 ft | 171 |
| | 0.4 mm (L) | L = 200 m – 3500 m/50 m | 67 |
| | 0.5 mm (L) | L = 200 m – 5000 m/50 m | 97 |
| 2-section | 26AWG (L1) + 24AWG(L2) | L1, L2 = 1 kft – 9 kft/500 ft | 289 |
| | 0.4 mm(L1) + 0.5 mm(L2) | L1, L2 = 200 m – 3000 m/200 m | 225 |
| | ETSI #3 (L = length of 0.4 mm section) | L = 50 m – 3000 m/50 m | 60 |
| 3-section | 26awg(L1) + 24awg(L2) + 26awg(L3) | L1, L2, L3 = 1 kft – 9 kft/2 kft L1 + L2 + L3 <= 18 kft | 90 |
| | ETSI #6 (L = length of 0.4 mm section) | L = 50 m – 3000 m/50 m | 60 |
| | ETSI #7 (L = length of 0.4 mm section) | L = 50 m – 3000 m/50 m | 60 |
| 4-section | 26awg + 24awg + 26awg + 24awg | The length of each section is randomly chosen. The total physical length is less than 18 kft. | 30 |
| | ETSI #4 (L = length of 0.4 mm section) | L = 50 m – 3000 m/50 m | 60 |
| | ETSI #5 (L = length of 0.4 mm section) | L = 50 m – 3000 m/50 m | 60 |

Exemplary FIGS. 12, 13 and 14 indicate that the equivalent-TDR length estimation error is less than 500 ft for 96% of the loops; that the US data rate estimation error is less than 100 kbps for 99% of the loops, and that the DS data rate estimation error is less than 500 kbps for 97% of the loops.

Figure 15:
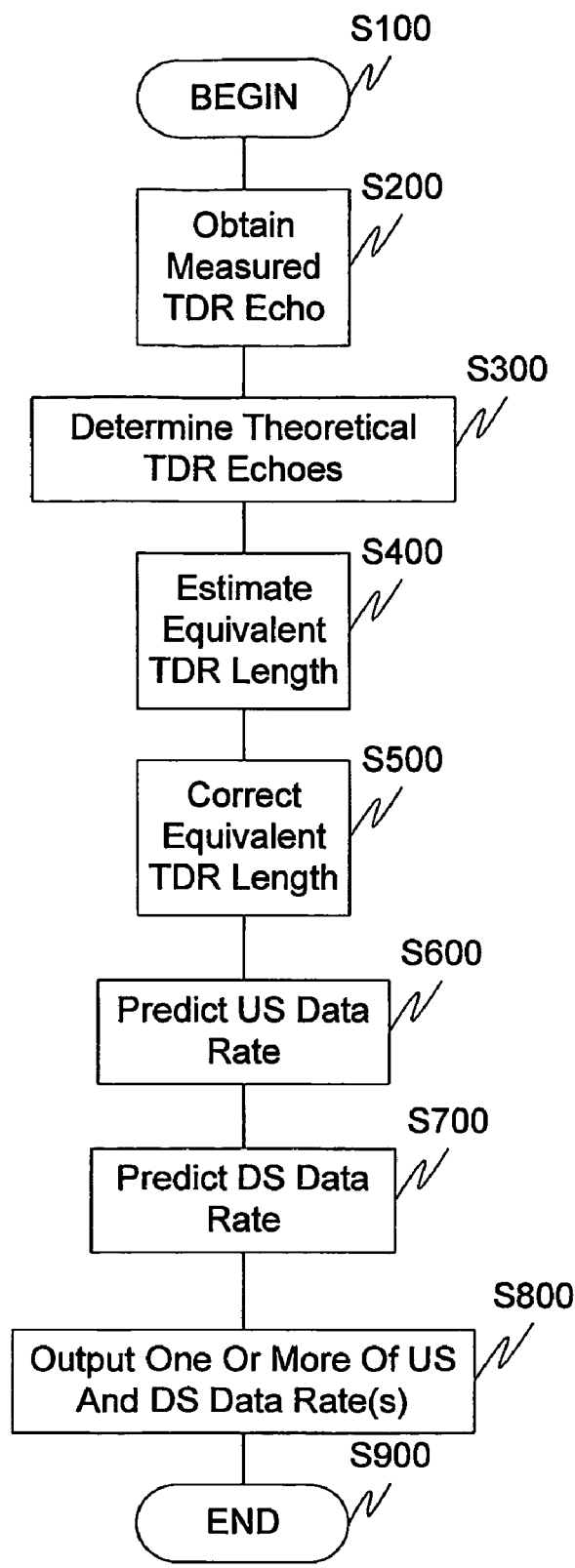
FIG. 15 is a flowchart illustrating an exemplary operational flow according to this invention.

FIG. 15 illustrates an exemplary method of predicting data rates according to this invention. In particular, control begins in step S100 and continues to step S200. In step S200, a measured TDR echo, is obtained. Next, in step S300, the theoretical TDR echo for 26 AWG straight loops with various loop lengths are determined and stored. It is to be appreciated however that the gauge of the equivalent loop does not necessary have to be 26 AWG, to the contrary, the gauge could be any gauge. The only requirement is the data rate of the selected gauge should be known. Furthermore, the described methodology is not only applicable to single gauge straight loops, but also multi-section loops with different gauges as well as loops with bridged taps.

Then, in step S400, the equivalent TDR length is estimated. As discussed above, this is determined by:

(1) Finding the best time shift between the measured far-end echo and the theoretical far-end echo of the nth loop by solving the following optimization problem:

$$\min_m \sum_{j=0}^{WN-1} [\text{echo\_measured}(j+m) - \text{echo\_model}_n(j)]^2,$$

(2) where m is a variable representing the time shift, which varies in a certain region with a one-sample step. The minimum error across m is denoted as E(n), and the corresponding best shift as S(n).

(3) Let n=n+1. If n≦N, go to (1); otherwise go to (3).

(4)

$$\text{Let } n^* = \min_n E(n),$$

then the equivalent TDR length, $L_{eq\_tdr}$, is:

$$L_{eq\_tdr} = L_{n^*},$$

(5) and the corresponding time shift, denoted as $s^*$, is:

$$s^* = S(n^*).$$

Control then continues to step S500.

In step S500, the equivalent-TDR length for data rate prediction is corrected. According to the analysis given above, the equivalent-US-rate length and the equivalent-DS-rate length relate to $L_{eq\_tdr}$ and $s^*$:

$$L_{eq\_us} = L_{eq\_tdr}, \text{ and}$$

$$L_{eq\_ds} = L_{eq\_tdr} + s^* \cdot \tau_{mean} = L_{eq\_tdr} + s^* \cdot 40 (\text{ft/sample}).$$

The US and DS data rates are then predicted in steps S600 and S700, respectively, in accordance with the following, which can be one or more of output and or displayed on a display device (not shown), by letting the US rate-length function for 26 AWG loops be $\text{Rate}_{US}(L)$, and the DS rate-length function be $\text{Rate}_{DS}(L)$, then the US rate, denoted as US_Rate, and the DS rate, denoted as DS_Rate, are:

$$\text{US\_Rate} = \text{Rate}_{US}(L_{eq\_us}), \text{ and}$$

$$\text{DS\_Rate} = \text{Rate}_{DS}(L_{eq\_ds}).$$

One or more of the US and DS data rate(s) are then output in step S800 and control continues to step S900 where the control sequence ends.

The above-described system can be implemented on wired and/or wireless telecommunications devices, such a modem, a multicarrier modem, a DSL modem, an ADSL modem, an XDSL modem, a VDSL modem, a linecard, test equipment, a multicarrier transceiver, a wired and/or wireless wide/local area network system, a satellite communication system, a modem equipped with diagnostic capabilities, or the like, or on a separate programmed general purpose computer having a communications device.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, modem, transmitter/receiver, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein however can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software, that can be stored on a storage medium, executed on programmed general-purpose computer, a special purpose computer, a microprocessor, or the like. In these instances, the systems and methods of this invention can be implemented as program embedded on personal computer such as JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver and operations support system.

It is therefore apparent that there has been provided, in accordance with the present invention, systems and methods for estimating channel data rate. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method for channel capacity estimation comprising:
obtaining a measured TDR echo at a channel capacity estimator;
determining a set of theoretical TDR echo values for a plurality of loop lengths;
estimating an equivalent TDR length based on an error minimization optimization that includes the theoretical TDR echo values and the measured TDR echo;
updating the equivalent TDR length; and
utilizing the updated TDR length to predict one or more of the upstream and downstream data rates.

2. The method of claim 1, further comprising determining a time shift between the measured TDR echo and the theoretical TDR echo.

3. The method of claim 2, wherein the measured TDR echo is a measured far-end echo, and the theoretical TDR echo is a theoretical far-end echo.

4. The method of claim 1, wherein the updating step is based on a time shift and an equivalent TDR length.

5. The method of claim 1, wherein the methodology is applicable to one or more of single gauge straight loops, multi-section loops with different gauges and loops with bridged taps.

6. A method comprising:
estimating a physical loop length based on an equivalent TDR loop length and a time shift between a measured echo and an echo from an equivalent loop.

7. A channel capacity estimation system comprising:
means for obtaining a measured TDR echo;
means for determining a set of theoretical TDR echo values for a plurality of loop lengths;
means for estimating the equivalent TDR length based on an error minimization optimization that includes the theoretical TDR echo values and the measured TDR echo;
means for updating the equivalent TDR length; and means for utilizing the updated TDR length to predict one or more of the upstream and downstream data rates.

8. The system of claim 7, further comprising means for determining a time shift between the measured TDR echo and the theoretical TDR echo.

9. The system of claim 8, wherein the measured TDR echo is a measured far-end echo, and the theoretical TDR echo is a theoretical far-end echo.

10. The system of claim 7, wherein the updating is based on a time shift and an equivalent TDR length.

11. The system of claim 7, wherein the system is adapted to estimate channel capacity for single gauge straight loops, multi-section loops with different gauges and loops with bridged taps.

12. An information storage media having stored thereon information configured to estimate channel capacity comprising:
- information that obtains a measured TDR echo;
- information that determines a set of theoretical TDR echo values for a plurality of loop lengths;
- information that estimates the equivalent TDR length based on an error minimization optimization that includes the theoretical TDR echo values and the measured TDR echo;
- information that updates the equivalent TDR length; and
- information that utilizes the updated TDR length to predict one or more of the upstream and downstream data rates.

13. A channel capacity estimation system comprising:
- a TDR echo measurement module;
- a theoretical TDR echo determination module adapted to determine a set of theoretical TDR echo values for a plurality of loop lengths;
- an equivalent TDR length estimation module adapted to estimate the equivalent TDR length based on an error minimization optimization that includes the theoretical TDR echo values and the measured TDR echo; and
- an upstream and downstream data rate prediction module adapter to utilize an updated TDR length to predict one or more of the upstream and downstream data rates.

14. The system of claim 13, further comprising a controller adapted to determine a time shift between a measured TDR echo and the theoretical TDR echo.

15. The system of claim 14, wherein the measured TDR echo is a measured far-end echo, and the theoretical TDR echo is a theoretical far-end echo.

16. The system of claim 13, wherein the system is adapted to estimate channel capacity for single gauge straight loops, multi-section loops with different gauges and loops with bridged taps.

* * * * *